United States Patent [19]

Suzuki

[11] Patent Number: 5,172,373
[45] Date of Patent: Dec. 15, 1992

[54] PACKET COMMUNICATION SYSTEM AND ITS CONTROL METHOD

[75] Inventor: Muneyuki Suzuki, Inagi, Japan

[73] Assignee: Kabushiki Kaisha Toshiba, Kawasaki, Japan

[21] Appl. No.: 426,211

[22] Filed: Oct. 25, 1989

[30] Foreign Application Priority Data

Oct. 27, 1988 [JP] Japan .................. 63-271600

[51] Int. Cl.⁵ .............................................. H04J 3/02
[52] U.S. Cl. ............................... 370/85.11; 370/94.1; 370/85.6; 340/825.5
[58] Field of Search ..................... 370/85.11, 94.1, 60, 370/85.5, 85.6, 85.9, 85.7, 85.4, 85.1, 85.2; 340/825.5, 825.51, 825.01

[56] References Cited

U.S. PATENT DOCUMENTS

| | | | |
|---|---|---|---|
| 4,535,454 | 8/1985 | Buzzard et al. | 370/85.9 |
| 4,550,402 | 10/1985 | Gable et al. | 370/85.11 |
| 4,559,595 | 12/1985 | Boudreau et al. | 370/85.6 |
| 4,626,843 | 12/1986 | Szeto et al. | 370/85.6 |
| 4,658,250 | 4/1987 | Nering et al. | 370/85.2 |
| 4,707,828 | 11/1987 | Yamada | 370/85.7 |
| 4,748,560 | 5/1988 | Kataoka | 370/85.4 |
| 4,818,985 | 4/1989 | Ikeda | 370/85.2 |
| 4,970,720 | 11/1990 | Esaki | 370/85.2 |

Primary Examiner—Douglas W. Olms
Assistant Examiner—Dang Ton
Attorney, Agent, or Firm—Finnegan, Henderson, Farabow, Garrett and Dunner

[57] ABSTRACT

A packet communication system suitable for a high speed bus, and a method of controlling the system. A data bus is divided into a control bus for receiving data for contention control and a transmission bus for receiving only communication data including destination data. Each terminal interface transmits the contention control data to the control bus in the transmission cycle prior to transmission of its packet to perform contention control. Thus, exclusive occupation authority of the transfer bus is acquired prior to packet transmission. Each terminal interface finishes the contention control in the cycle prior to the data transmission cycle to previously make a reservation for the use of the bus, and outputs the packet following the DLA onto the transmission bus in the next data transmission cycle.

14 Claims, 6 Drawing Sheets

PACKET COMMUNICATION SYSTEM AND ITS CONTROL METHOD

BACKGROUND OF THE INVENTION

1. Field of the Invention

The present invention relates to a packet communication system which is suitable for a high speed bus, and a method of controlling the system.

2. Description of the Related Art

Figure 1:
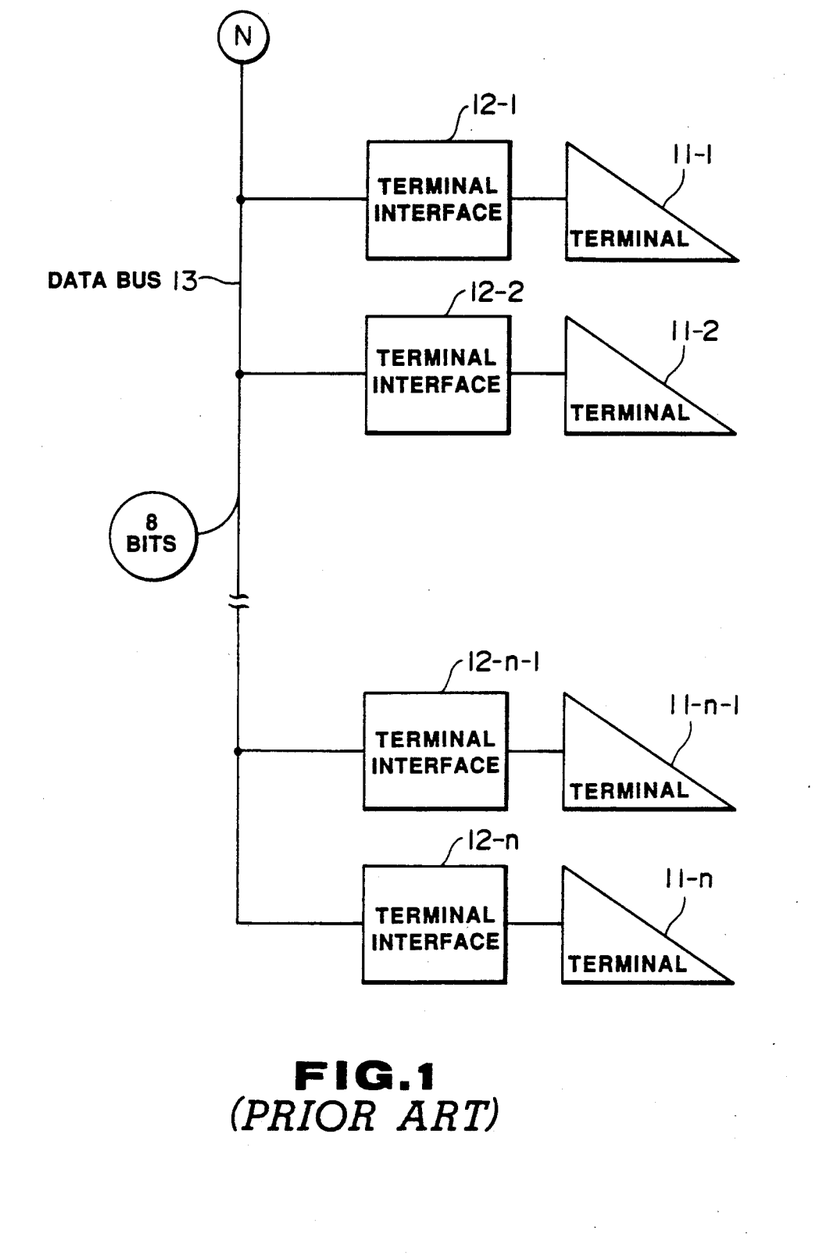
FIG. 1 shows an arrangement of a prior art packet communication system.

FIG. 1 shows a prior art packet communication system, in which n terminals (TEs) 11-1 to 11-$n$ are connected with associated terminal interfaces (TE-IFs) 12-1 to 12-$n$ which in turn are connected to a common data bus 13.

With such an arrangement, transmission data from the respective terminals 11-1 to 11-$n$ are, at the associated terminal interfaces 12-1 to 12-$n$, resolved into packets of a predetermined data unit (for example, a packet of 64 bytes). The packets have destination terminal interface addresses (DLAs) as destination data attached, have a header (BAH) for acquiring the exclusive occupation authority of the data bus 13 attached, and then are output to the bus 13 in synchronism with the output timing of the bus 13.

Packets transmitted to the data bus 13, on the other hand, are commonly received at the respective terminal interfaces 12-1 to 12-$n$ where the destination data (DLA) of the received packets are checked. If a terminal interface finds its own destination data, then the terminal interface deletes the DLA of the received packet and sends only the data part indicative of the communication contents in the packet to the associated terminal.

In such conventional systems, some of the terminals 11-1 to 11-$n$ sometimes generate data transmission requests at the same time. The terminal interfaces 12-1 to 12-$n$ associated with the terminals 11-1 to 11-$n$ are connected to the common data bus 13. Thus, when data transmission requests from more than one of the terminals 11-1 to 11-$n$ occur, each of the terminals exclusively occupy the data bus 13 only during its data transmission. To this end, contention control is carried out over the data bus 13 by use of a header BAH.

During contention control, a packet transmission authority, i.e., the exclusive occupation authority, is given to a highest-priority one of the terminal interfaces that have transmitted packets at the same time. A priority order is established for the respective terminal interfaces 12-1 to 12-$n$ and a unique number indicative of the priority order is set in the header BAH. In more detail, the terminal interface that desires to perform data transmission outputs the header BAH onto the bus 13 in synchronism with a bus timing clock CCCK shown in a timing chart of FIG. 5. The terminal interface in question then examines the headers BAHs on the bus 13 and determines the presence or absence of the header BAHs issued from the terminal interface or interfaces having priority higher than its own priority.

If the terminal interface in question detects the header(s) BAH(s) issued from the terminal interface(s) having priority higher than its own, then it stops the transmission of the part of the packet subsequent to the address data (DLA) and waits for the transmission until the next cycle. When the terminal interface in question fails to detect any header BAH issued from a terminal interface having priority higher than its own, it acquires the exclusive occupation authority of the bus 13 and transmits its packet. Accordingly, it is only a highest-priority one of the terminal interfaces that issues their packets at the same time that can output its packet at the stage of the completion of transmission of the header BAH.

Figures 2A, 2B:
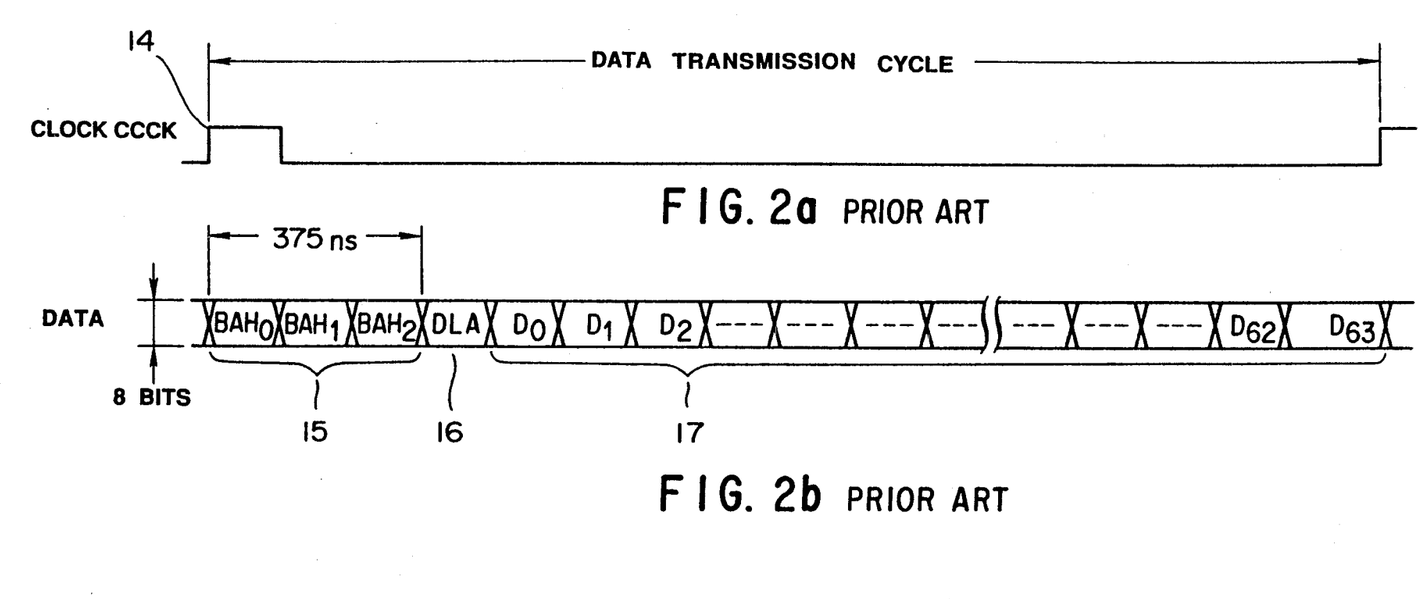
FIGS. 2a-2b are a timing chart for explaining timing between a packet and a clock signal in the prior art packet communication system.

Shown in FIGS. 2a-2b are a timing chart that shows packet transmission timing. A reference numeral 14 denotes a bus timing clock signal CCCK. A reference numeral 15 denotes a header (BAH) for contention control of the bus 13. A reference numeral 16 denotes the address (DLA) of a party (destination) terminal interface. A reference numeral 17 denotes a data corresponding to one data transmission cycle from a high level of the bus timing clock CCCK to the next high level thereof.

When one of the terminals 11-1 to 11-$n$ generates a data transmission request, the terminal interface connected to the terminal in question, as shown in FIG. 2, attaches a DLA 16 of one byte and a header BAH 15 of three bytes (consisting of BAH0 to BAH3) to the data 17 of a 64-byte unit (consisting of D0 to D63) to create a 68-byte packet, and then outputs the packet onto the bus 13 in synchronism with the bus timing clock signal CCCK. At this time, if some of the remaining terminal interfaces also output their packets to the bus 13 simultaneously with the packet output of the terminal interface in question, the contention control described above is carried out.

Figure 3:
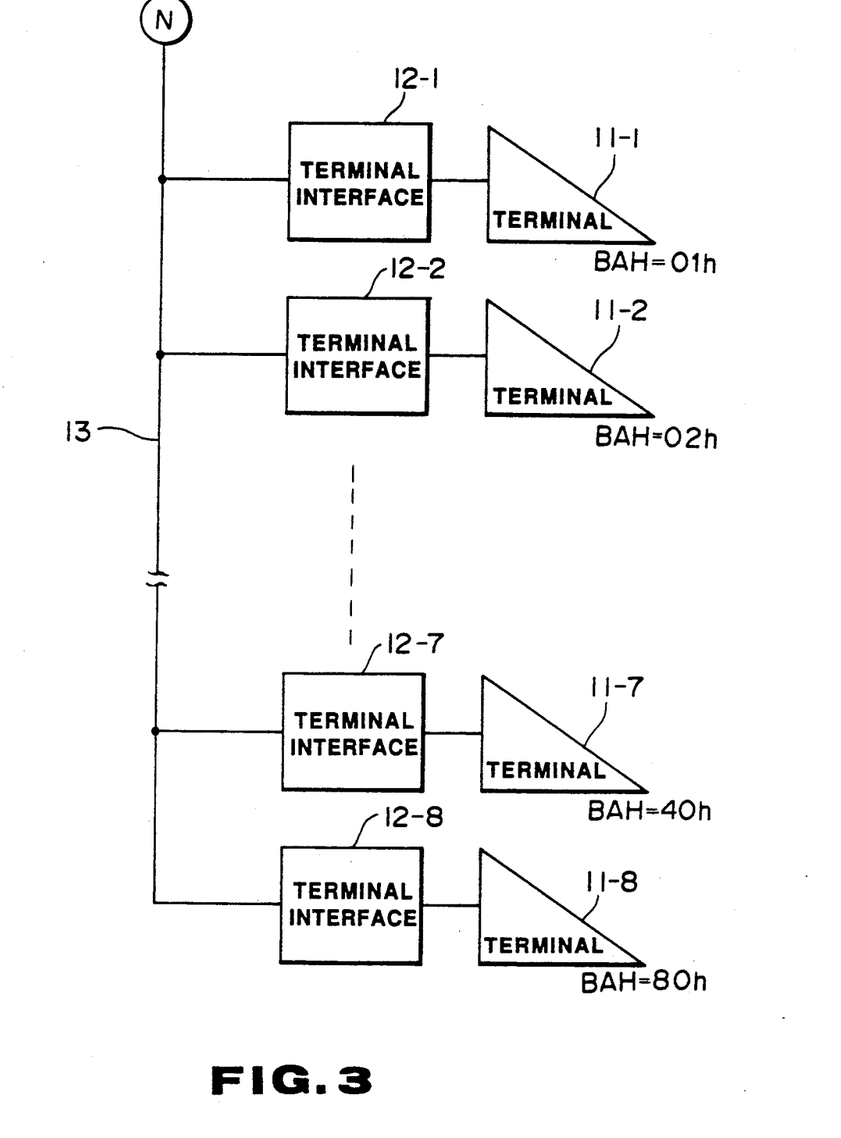
FIG. 3 is a block diagram for explaining prior art contention control.

Assume now, as a simple example, that a total of 8 terminals 11-1 to 11-8 are provided, as shown in FIG. 3, that the data bus 13 is an 8 bit bus, and that numbers n (n=0 to 7) indicative of priorities are given as their headers BAHs to the respective terminal interfaces 12-1 to 12-8. The header BAH given to each of the terminal interfaces has a hexadecimal digit of a decimal digit $2^n$, where n is the priority number. Thus, the terminal interface 12-1 having a priority number 0 has a header BAH of (01)h, and the terminal interface 12-8 having a priority number 7 has a header BAH of (80)h. The respective terminal interfaces 12-1 to 12-8, when starting the data transmission cycle of the bus timing clock signal CCCK, outputs to the data bus 13 their data starting with the header BAH followed by the DLA and the data. At this time, because the bus 13 is driven by an open-collector driver provided in the each terminal interface, when all the 8 terminal interfaces 12-1 to 12-8 generate transmission requests at the same time, the data on the bus 13 become (FF)h and the data values are taken by the respective terminal interfaces.

Because one of the terminal interfaces having the smallest header BAH can acquire packet transmission authority, the terminal interface 12-1 having a number 0 and thus having a header of (01)h (having "1" at the lowest bit position) can acquire the transmission authority and can transmit its packet onto the bus 13.

As described above, in prior art packet communication systems, the plurality of terminal interfaces 12-1 to 12-$n$ are connected to the common data bus 13 and contention control for acquiring the exclusive occupation authority of the bus 13 is carried out by use of the data bus 13 for packet transmission. For this reason, contention control must be terminated in the output period of the header BAH in the former half of the one data transmission cycle.

In practical applications, however, approximately 512 terminal interfaces are provided and the header BAH consists of 3 bytes. In this case, if the bus operational rate is 8 MHz, then the transfer cycle for one byte becomes 125 ns. As a result, contention control must be terminated in a time period of 375 ns (=125 ns×3). When the bus operational rate increases, contention control must be processed in a further shorter time, which means that an increase of the bus operational rate is restricted by the contention control time.

SUMMARY OF THE INVENTION

It is an object of the present invention to provide a bus control method in a packet communication system that can eliminate the above problem in the prior art and can increase the bus operational rate.

In accordance with the present invention, a data bus is divided into a control bus for receiving data for contention control and a transmission bus for receiving only communication data including destination data. Each terminal interface transmits the contention control data to the control bus in the transmission cycle prior to transmission of its packet to perform contention control. Thus, exclusive occupation authority of the transfer bus is acquired prior to packet transmission.

Each terminal interface finishes the contention control in the cycle previous to the data transmission cycle to reserve the bus, and outputs the packet following the DLA onto the transmission bus in the next data transmission cycle. In this case, the transmission of one packet requires a time corresponding to the two cycles but when the bit width of the transmission bus is made to be, for example, twice that of the prior art, the packet transmission can be achieved in the same time as in the prior art. As a result, the same packet transmission time can be achieved as the processing time necessary for the contention control so that, even when the operational rate of the transmission bus is increased, the problem of a short contention control processing time can be solved. Thus data on the transmission bus can be easily processed at a higher speed.

In this way, in the present invention, because the data bus is divided into the contention control bus and the packet transmission bus, the packet transmission rate of the packet transmission bus can be made faster, while not restricted to the contention control time.

DESCRIPTION OF THE PREFERRED EMBODIMENTS

Figure 4:
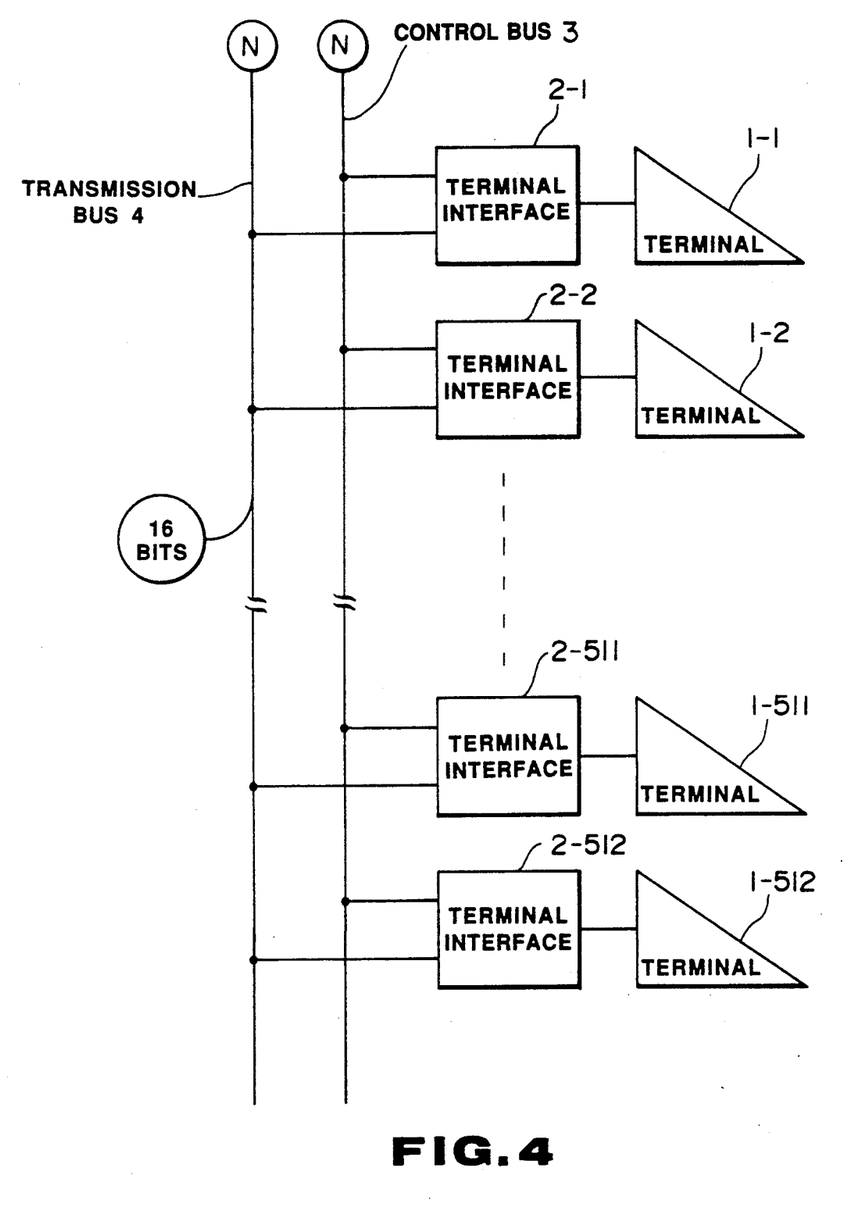
FIG. 4 shows an arrangement of an embodiment of the present invention.

FIG. 4 shows an arrangement of an embodiment of the present invention, in which 512 terminals 1-1 to 1-512 are connected to associated terminal interfaces 2-1 to 2-512, respectively, which in turn are connected to a common control bus 3 and a common transmission bus 4 of 16 bit configuration.

Figure 5A:
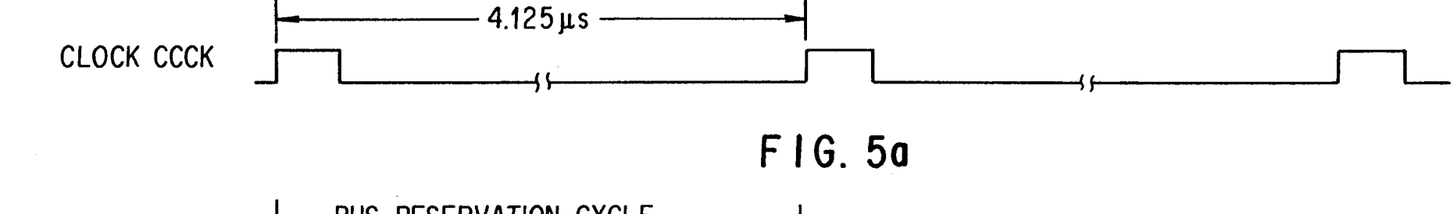
FIGS. 5a-5c are a timing chart for explaining the operation of the embodiment of FIG. 4.
Figure 5B:
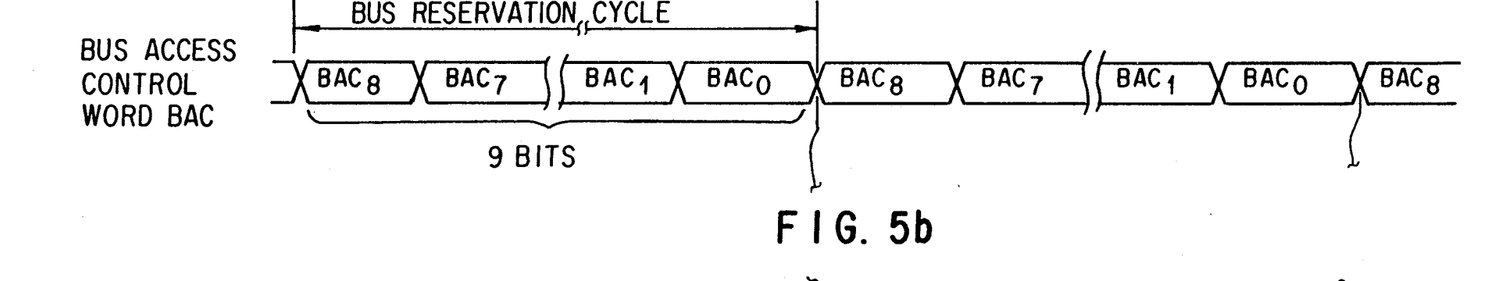
Figure 5C:
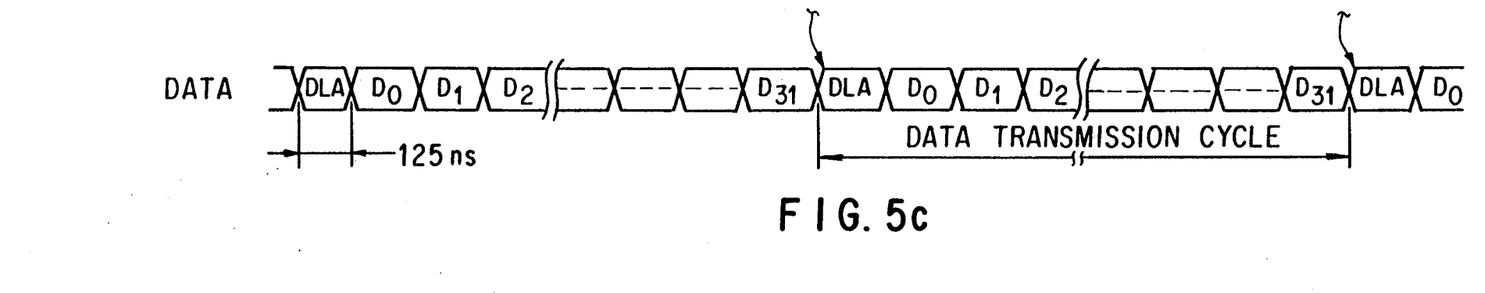

With such an arrangement, when the respective terminals 1-1 to 1-512 generate data transmission requests, the associated terminal interfaces 2-1 to 2-512 output bus access control word BAC in synchronism with a bus timing clock CCCK signal as shown in FIG. 5 to acquire the occupation authority of the transmission bus 4 in a data transmission cycle (bus reservation cycle) previous by one cycle to the packet transmission. One of the terminal interfaces that acquired the occupation authority of the bus 4 through the BAC contention control adds a destination terminal interface address (DLA) as a destination data to the transmission data to prepare a packet and sends the packet onto the bus 4, in the next data transmission cycle of the clock signal CCCK.

A packet transmitted to the bus 4, on the other hand, is commonly received at the respective terminal interfaces 2-1 to 2-512. The respective terminal interfaces 2-1 to 2-512 examine the destination data (DLA) of the received packet. One of the terminal interfaces, when finding that the destination data is for itself, deletes the DLA of the received packet paket and then sends only the data part of the received packet indicative of the communication contents to an associated one of the terminals 1-1 to 1-512.

When some of the terminal interfaces 2-1 to 2-512 issue packet transmission requests at the same time, that is, when the system is in contention control mode, a packet transmission authority is given to a highest-priority one of these terminal interfaces. In the contention control mode, such a series of operations as the transmission, reception, and comparison of the word BAC carried out during the aforementioned bus reservation cycle, are repeated.

More specifically, priorities are given to the terminal interfaces 2-1 to 2-512, respectively, and numbers indicative of their priorities are uniquely set at the respective words BAC to be output onto the control bus 3 during the bus reservation cycle. Because up to 512 terminal interfaces are provided in the illustrated embodiment, the priorites are ordered from the 1st to 512th and the corresponding priority numbers 0 to 511 are allocated to the words BAC of the respective terminal interfaces. The words BAC are output to the control bus 3 in the form of binary serial data. Thus, a word BAC comprises BAC8 (MSB) to BAC0 (LSB) of a 9-bit length as shown in the timing chart of FIG. 5. The output of the word BAC to the control bus 3 is carried out by an open-collector type driver.

Some of the terminal interfaces 2-1 to 2-512 that issued transmission requests output their words BAC from their MSB side to the control bus 3 in synchronism with the timing clock signal CCCK corresponding to the bus reservation cycle shown in FIG. 5. During contention control, the terminal interface that issued "0" to the control bus 3 can always win packet transmission authority. If there is no terminal interface that issued "0", then one of the other terminal interfaces can win the transmission authority. In this manner, the respective interfaces that issued their words BAC can receive the data (BAC) from the control bus 3 and determine whether to win the authority. The terminal interfaces that lost in the contention, stop the output of the subsequent BAC bits to the control bus 3. Eventually, after the respective terminal interfaces output all the 9-bit headers, one of the terminal interfaces having the highest priority wins and acquires occupation authority of the bus 4. In the subsequent data transmission cycle, the winning terminal interface outputs a packet including the destination data (DLA) onto the bus 4.

It is assumed in the example of FIG. 5 that the length of a packet is 66 bytes (corresponding to a total of (33 bytes of D0 to D31 and DLA) ×2) and that the transmission rate of the bus 4 is 8 MHz (1 byte=125 ns). Accordingly, the data transmission cycle becomes 4.125 μs (=125 ns ×33). Thus, the contention control must be performed in a time of 4.125 μs that is equal to the data transmission cycle, so that, even when the data transmission rate of the bus 4 is set to be four times as large as 1 μs, contention control can be realized with a sufficient time allowance. In other words, the transmission rate of the bus 4 can be made much faster without any restrictions of the contention control time.

Because the control bus 3 is physically separate from the transmission bus 4, operational clock signals for both buses may be separately provided as necessary.

Figure 6:
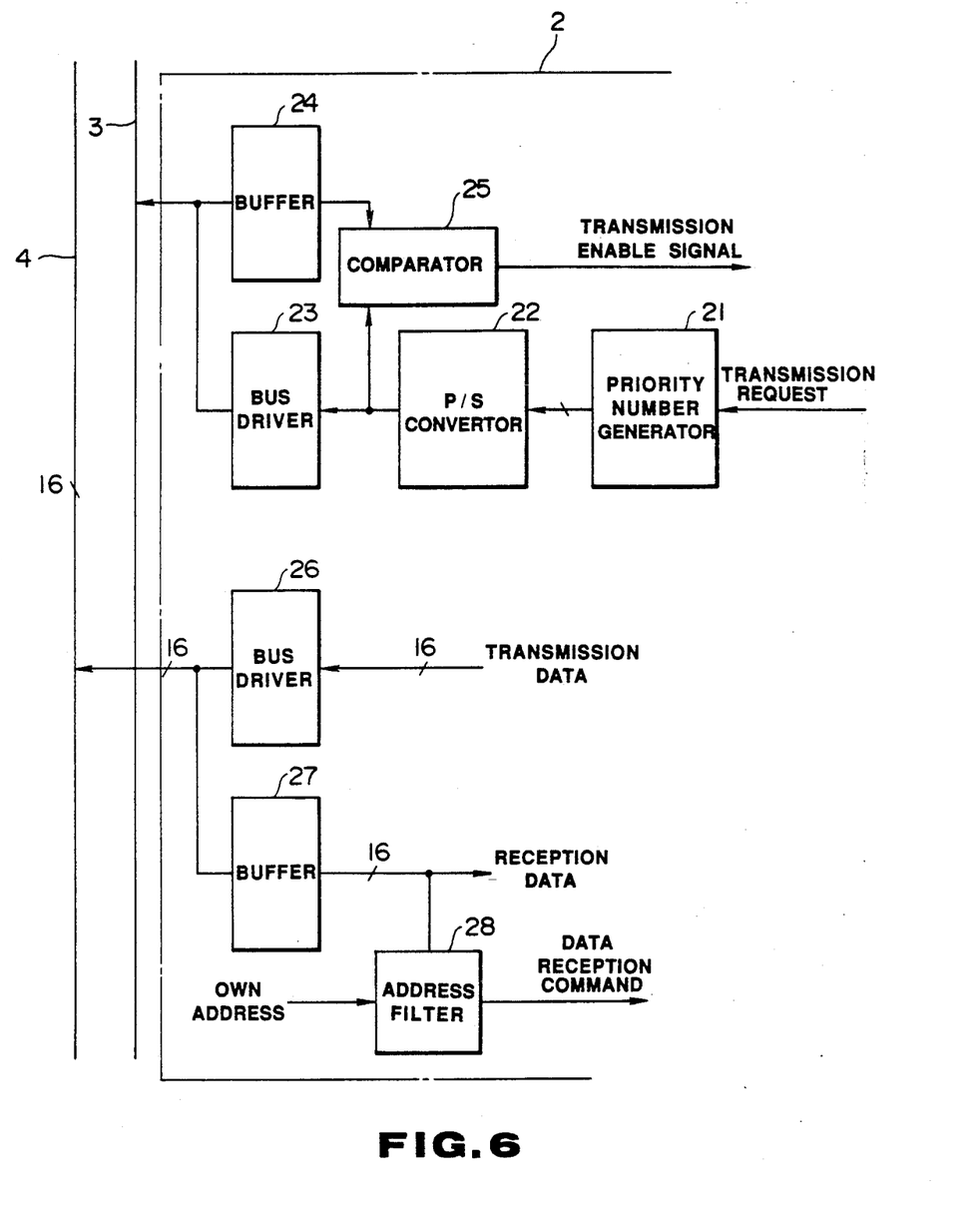
FIG. 6 is a block diagram of an embodiment of a terminal interface used in the embodiment of FIG. 4.

FIG. 6 shows a major part of one of the terminal interfaces 2 used in the embodiment. In the drawing, when the terminal interface 2 issues a transmission request, the request is applied to a priority number generator 21 so that priority number generator 21, which previously set a priority number indicative of the priority of this terminal interface 2 therein, generates its own priority number in the form of a 9-bit priority data (because the number of terminals is 512 decimal). This priority data is applied to a parallel-serial converter 22 and converted to a serial signal therein, and then output onto the control bus 3 through an open-collector bus driver to a period.

A signal on the control bus 3, on the other hand, is sent through a buffer, 24 to a comparator 25. The comparator 25 also inputs a serial priority data output from the parallel-serial converter 22. The comparator 25 compares the signal received from the control bus 3 with the serial priority data output from the parallel/serial converter 22 on a one bit basis. Because the bus driver 23 is an open collector circuit, when its own terminal interface outputs a priority data "1" but one of the other terminal interfaces outputs a priority data "0", the signal of the control bus 3 becomes "0" and the comparator 25 detects a non-coincidence. In this case, the comparator 25 stops its output of a transmission enable signal to stop the transmission of subsequent priority data from the terminal interface 2. When terminal interface 2 outputs the priority data "1" and any one of the other terminal interfaces does not output a priority data "0" or when the own terminal interface 2 outputs a priority data "0", the comparator 25 detects a coincidence and continues to send the transmission enable signal. After all the 9-bit priority data output from the respective terminal interfaces in this manner, only one of the terminal interfaces having the highest priority can issue the transmission enable signal. As a result, the terminal interface having the highest priority can be selected.

When the terminal interface completes its transmission of the priority data and the comparator of that terminal interface is outputting the transmission enable signal, the terminal interface can transmit the transmission data through a bus driver 26 onto the transmission bus 4.

Data on the transmission bus 4, meanwhile, is received at a buffer 27 so that, when the address DLA of the received data located at its head position coincides with the DLA of its own interface, an address filter 28 generates a data reception command to start the reception of the data.

What is claimed is:

1. A packet communication system, comprising:
   a plurality of terminal units;
   a contention control bus connecting the terminal units for serially sending priority data;
   a multi-bit data transmission bus connecting the terminal units for sending transmission data; and
   a plurality of terminal interface means associated with respective ones of said plurality of terminal units, for serially outputting on a bit-by-bit basis predetermined priority data for contention control to said contention control bus and inputting data from said contention control bus, for comparing on a bit-by-bit basis said priority data serially output to said contention control bus with said data inputted from said contention control bus to generate a comparison result, for transmitting a transmission enable signal to a corresponding one of said plurality of terminal units on the basis of the comparison result, and for sending transmission data output from said corresponding one of said terminal units in response to said transmission enable signal to said data transmission bus.

2. A packet communication system as set forth in claim 1, wherein, when more than one of said terminal interface means outputs their priority data to said contention control bus at the same time, one of said terminal interface means transmits the transmission enable signal to acquire data transmission authority only if the priority data output from said one of said terminal interface means is a highest priority data among the output plurality of priority data.

3. A packet communication system as set forth in claim 2, wherein ones of said terminal interface means transmit said priority data to said contention control bus during a bus reservation cycle for acquiring the data transmission authority for data transmission and said one terminal interface means outputting a highest priority transmits the transmission data based on the data transmission authority, acquired during said bus reservation cycle, to said data transmission bus during a data transmission cycle following said bus reservation cycle.

4. A packet communication system as set forth in claim 3, wherein ones of said terminal interface means output the priority data, for acquiring data transmission authority for a next data transmission, to said contention control bus during said data transmission cycle for transmitting the transmission data to said data transmission bus.

5. A packet communication system as set forth in claim 4, wherein said data transmission cycle has a same time duration as said bus reservation cycle.

6. A packet communication system as set forth in claim 1, wherein each of said terminal interface means includes:
   means for generating predetermined priority data in response to a transmission request from an associated terminal unit;
   means for serially sending said predetermined priority data generated by said priority data generating means to said contention control bus;
   means for inputting the data on said contention control bus; and
   comparison means for comparing on a bit-by-bit basis said priority data serially sent from said priority data sending means with said data on said contention control bus input by said priority data inputting means, and for outputting the transmission enable signal in accordance with a comparison result.

7. A packet communication system as set forth in claim 6, wherein said priority data sending means includes an open collector type circuit.

8. A packet communication system as set forth in claim 6, wherein each of said terminal interface means further includes:
   means for sending the transmission data to said data transmission bus in response to said transmission enable signal output from said comparison means;
   means for inputting said transmission data from said data transmission bus; and
   generating means for generating a data reception command when a transmitted address data placed at a head position of said transmission data coincides with an own address data of said terminal interface means.

9. A packet communication system as set forth in claim 6, wherein each of said terminal interface means accepts a next data transmission request simultaneously with the start of reception of the transmission data.

10. A method of controlling a packet communication system including a plurality of terminal units, a contention control bus, a multi-bit data transmission bus, and a plurality of terminal interface means connected to respective ones of said terminal units, said contention control bus and said data transmission bus, said method comprising:
   a first step of serially outputting priority data for contention control;
   a second step of inputting data on said contention control bus;
   a third step of comparing on a bit-by-bit basis said priority data serially output to said contention control bus with said data on said contention control bus and transmitting a transmission enable signal to a corresponding terminal unit on the basis of a comparison result; and
   a fourth step of transmitting to said data transmission bus the transmission data output from said corresponding terminal unit in response to said transmission enable signal.

11. A method of controlling a packet communication system as set forth in claim 10, wherein said first and fourth steps are executed in parallel.

12. A method of controlling a packet communication system as set forth in claim 10, wherein said first and third steps are executed during a bus reservation cycle, and said fourth step is executed during a data transmission cycle on the basis of the transmission enable signal transmitted in said third step during said bus reservation cycle preceding said data transmission cycle.

13. A method of controlling a packet communication system as set forth in claim 12, wherein said data transmission cycle is set to be the same time length as said bus reservation cycle.

14. A terminal interface for use in a packet communication system including a plurality of terminal units, at least one of the plurality of terminal units coupled to a contention control bus and including a terminal interface, said terminal interface comprising:
   means for generating predetermined priority data in response to a transmission request from an associated one of the plurality of terminal units;
   means for serially sending said predetermined priority data generated by said priority data generating means to said contention control bus;
   means for inputting the data on said contention control bus; and
   comparison means for comparing on a bit-by-bit basis said priority data serially sent from said priority data sending means with said data on said contention control bus input by said data inputting means to send the transmission enable signal.

* * * * *